US011753009B2

United States Patent
Ostafew et al.

(10) Patent No.: US 11,753,009 B2
(45) Date of Patent: Sep. 12, 2023

(54) INTELLIGENT PEDAL LANE CHANGE ASSIST

(71) Applicant: Nissan North America, Inc., Franklin, TN (US)

(72) Inventors: Christopher Ostafew, Mountain View, CA (US); Qizhan Tam, Santa Clara, CA (US); Therese Cypher-Plissart, Sunnyvale, CA (US)

(73) Assignee: Nissan North America, Inc., Franklin, TN (US)

( * ) Notice: Subject to any disclaimer, the term of this patent is extended or adjusted under 35 U.S.C. 154(b) by 160 days.

(21) Appl. No.: 17/245,290

(22) Filed: Apr. 30, 2021

(65) Prior Publication Data

US 2022/0348201 A1 Nov. 3, 2022

(51) Int. Cl.
*B60W 30/16* (2020.01)
*B60K 26/02* (2006.01)
(Continued)

(52) U.S. Cl.
CPC ........... *B60W 30/16* (2013.01); *B60K 26/021* (2013.01); *B60W 30/18163* (2013.01);
(Continued)

(58) Field of Classification Search
CPC ........... B60W 30/16; B60W 30/18163; B60W 40/04; B60W 2520/10; B60W 2520/14;
(Continued)

(56) References Cited

U.S. PATENT DOCUMENTS 10,737,667 B2   8/2020  D'sa et al.
2010/0198478 A1  8/2010  Shin
(Continued)

FOREIGN PATENT DOCUMENTS

DE   102015212928 A1   1/2017
EP      3375656 A1    9/2018
(Continued)

OTHER PUBLICATIONS

Hisaie Nobutomo, Nov. 12, 2004, English Machine Translation_ JP 2006/137306 A provided by Patent Translate by EPO and Google (Year: 2004).*

(Continued)

*Primary Examiner* — Peter D Nolan
*Assistant Examiner* — Ashley L Redhead, Jr.
(74) *Attorney, Agent, or Firm* — Young Basile Hanlon & MacFarlane, P.C.

(57) ABSTRACT

A reactive pedal algorithm is used to modify an accelerator pedal output (APO)-to-torque conversion to produce more deceleration for the same accelerator pedal position. Modifying the APO-to-torque conversion provides the driver of a vehicle the sensation that the vehicle is resisting approaching closer to a lead vehicle. The APO-to-torque conversion is modified based on a scene determination to classify vehicles as in-lane, neighbor-lane, or on-coming. Lane change assist methods and systems are used to modify the APO-to-torque conversion range based on a lead vehicle, a neighbor vehicle, or both.

20 Claims, 6 Drawing Sheets

(51) Int. Cl.
  *B60W 30/18* (2012.01)
  *B60W 40/04* (2006.01)
(52) U.S. Cl.
  CPC ......... *B60W 40/04* (2013.01); *B60W 2520/10* (2013.01); *B60W 2520/14* (2013.01); *B60W 2540/18* (2013.01); *B60W 2540/20* (2013.01); *B60W 2552/00* (2020.02); *B60W 2554/4042* (2020.02); *B60W 2554/801* (2020.02); *B60W 2554/802* (2020.02); *B60W 2554/804* (2020.02)
(58) Field of Classification Search
  CPC ......... B60W 2540/18; B60W 2540/20; B60W 2552/00; B60W 2554/4042; B60W 2554/801; B60W 2554/802; B60W 2554/804; B60W 50/0098; B60W 50/087; B60W 2050/0027; B60W 2050/0075; B60K 26/021
  See application file for complete search history.

(56) References Cited

U.S. PATENT DOCUMENTS

| | | | |
|---|---|---|---|
| 2017/0158199 A1 | 6/2017 | Pallett et al. | |
| 2017/0232973 A1 | 8/2017 | Otake | |
| 2017/0248954 A1 | 8/2017 | Tomatsu et al. | |
| 2017/0259819 A1 | 9/2017 | Takeda | |
| 2017/0270799 A1 | 9/2017 | Takeda | |
| 2018/0050673 A1 | 2/2018 | D'sa et al. | |
| 2018/0194354 A1* | 7/2018 | Takeda | B60W 30/14 |
| 2018/0350242 A1 | 12/2018 | Fujii | |
| 2020/0164921 A1* | 5/2020 | Augst | B62D 15/025 |
| 2020/0207341 A1 | 7/2020 | Inoue et al. | |
| 2020/0290618 A1* | 9/2020 | Conrad | B60W 30/162 |
| 2020/0361456 A1 | 11/2020 | Stimpson et al. | |
| 2020/0376927 A1 | 12/2020 | Rajaie et al. | |
| 2020/0398836 A1 | 12/2020 | Wu et al. | |
| 2021/0094539 A1* | 4/2021 | Beller | G05D 1/0221 |
| 2021/0309254 A1 | 10/2021 | Murahashi et al. | |
| 2022/0017089 A1 | 1/2022 | Aikawa | |
| 2022/0055642 A1* | 2/2022 | Brewer | B60W 10/06 |
| 2022/0105925 A1* | 4/2022 | Naserian | B60L 7/18 |
| 2022/0176827 A1* | 6/2022 | Otanez | B60K 17/00 |
| 2022/0348201 A1* | 11/2022 | Ostafew | B60W 50/0098 |

FOREIGN PATENT DOCUMENTS

| | | |
|---|---|---|
| EP | 3075594 | 2/2019 |
| FR | 3092549 | 8/2020 |
| FR | 3093056 A1 | 8/2020 |
| GB | 2516934 A | 2/2015 |
| JP | 2006137306 A * | 6/2006 |
| JP | 2014004936 A * | 1/2014 |
| KR | 20180077248 | 7/2018 |
| WO | 2015059235 A2 | 4/2015 |
| WO | 2015124429 A2 | 8/2015 |

OTHER PUBLICATIONS

Takiguchi Hirotaka, Jun. 25, 2012, English Machine Translation_ JP 2014/004936 A provided by Patent Translate by EPO and Google (Year: 2012).*

Guo et al., A Computationally Efficient and Hierarchical Control Strategy for Velocity Optiinization of On-Road Vehicles, IEEE Transactions on Systems, MAN, AT iD Cybernetics: Systems, vol. 49, No. I. Jan. 2019. (11 pages).

Ye et al., Research on Dynamic Coordination Active Mode Switching Control Strategy for Hybrid Electric Vehicle Based on Traffic Information. IEEE Access, Aug. 14, 2019. (15 pages).

* cited by examiner

US 11,753,009 B2

INTELLIGENT PEDAL LANE CHANGE ASSIST

TECHNICAL FIELD

This disclosure relates to autonomous vehicle operational management and advanced driver assist systems.

BACKGROUND

One-pedal functionality in vehicles allows the driver to practically drive without using the brake pedal. It does this by allowing the driver to regulate relatively high deceleration rates using the accelerator pedal alone. However, a common complaint is that the vehicle decelerates too much when the driver releases the accelerator pedal, such as when cruising on the highway. This requires an increased focus of the driver to carefully regulate the speed of the vehicle. In some cases, the vehicle does not decelerate enough when the driver releases the accelerator pedal, such as when the vehicle ahead begins to decelerate rapidly. This causes an increase in stress while driving. Accordingly, systems and methods are needed to match accelerator pedal behavior with driver expectation.

SUMMARY

Disclosed herein are aspects, features, elements, implementations, and embodiments of reactive lane change assist in autonomous vehicle operational management and autonomous driving.

An aspect of the disclosed embodiments is a method for use in a host vehicle. The method includes determining a lead vehicle. The lead vehicle may be determined based on a proximate distance between the host vehicle and a lead vehicle candidate. The method includes determining a region of interest by a longitudinal distance and a first lateral distance. The longitudinal distance may be based on a speed of the host vehicle, a steering angle of the host vehicle, a yaw rate of the host vehicle, or any combination thereof. The first lateral distance may be based on a width of the lead vehicle. The region of interest may be based on a width of the lead vehicle. The region of interest may be a potential area of travel of the host vehicle. The method includes detecting a turn indicator of the host vehicle. The method includes increasing the region of interest by a second lateral distance. The region of interest may be increased in response to detecting the turn indicator of the host vehicle. The increased region of interest may include a neighbor vehicle. The second lateral distance may be based on a width of the neighbor vehicle. The method includes computing a feedback force based on a deceleration estimate of the lead vehicle, a deceleration estimate of the neighbor vehicle, or both. The method includes adjusting an accelerator pedal calibration, such as an accelerator pedal output (APO)-to-torque conversion, based on the computed feedback force.

An aspect of the disclosed embodiments is a host vehicle. The host vehicle may include one or more sensors. The one or more sensors may be configured to detect a proximate distance of an object from the host vehicle. The host vehicle may include a processor that is configured to determine that the object is a lead vehicle. The processor may determine that the object is a lead vehicle based on the proximate distance between the host vehicle and the object. The processor may be configured to determine a region of interest by a longitudinal distance and a first lateral distance. The longitudinal distance may be based on a speed of the host vehicle, a steering angle of the host vehicle, a yaw rate of the host vehicle, or any combination thereof. The first lateral distance may be based on a width of the lead vehicle. The first lateral distance may be associated with a width of the lead vehicle. The region of interest may be a potential area of travel of the host vehicle. The processor may be configured to detect a turn indicator of the host vehicle. The processor may be configured to increase the region of interest by a second lateral distance. The processor may be configured to increase the region of interest in response to the detection of the turn indicator. The increased region of interest may include a neighbor vehicle. The processor may be configured to compute a feedback force based on a deceleration estimate of the lead vehicle, a deceleration estimate of the neighbor vehicle, or both. The processor may be configured to adjust an accelerator pedal calibration, such as an APO-to-torque conversion, based on the computed feedback force. The processor may use the accelerator pedal calibration to estimate the driver's desired acceleration or deceleration rate from accelerator pedal position.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

A reactive pedal algorithm may be used to modify an accelerator pedal map to produce more deceleration for the same accelerator pedal position and vehicle speed. Modifying the accelerator pedal map may give the driver of a vehicle the sensation that the vehicle is resisting approaching closer to the lead vehicle. The accelerator pedal map may be modified based on a scene determination, for example, to classify vehicles as in-lane, neighbor-lane, or on-coming. The lane change assist methods and systems disclosed herein may modify the accelerator pedal range based on a lead vehicle, a neighbor vehicle, or both.

The lane change assist methods and systems disclosed herein may enhance driver comfort and enjoyment. For example, the accelerator pedal range may be adjusted to match driver expectation such that during open, free moving situations, the driver can relax and take their foot off the accelerator as the vehicle coasts and cruises as expected. In traffic or in locations requiring higher speed modulation, such as intersections and parking lots, for example, the vehicle may be configured to decelerate sufficiently when the driver releases the accelerator pedal. The methods and systems disclosed herein may use machine learning methods for continuous scene determination.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

Figure 1:
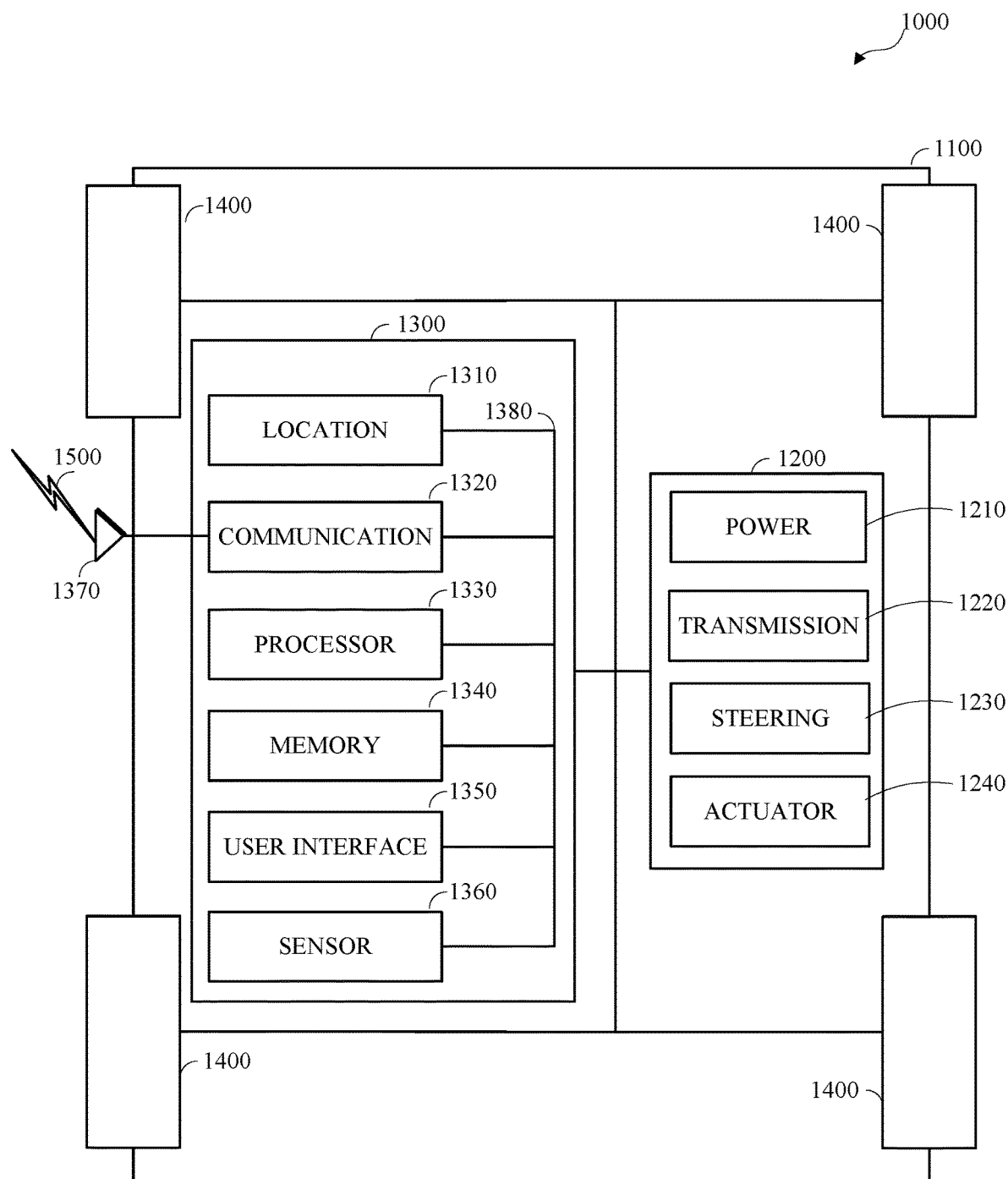
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
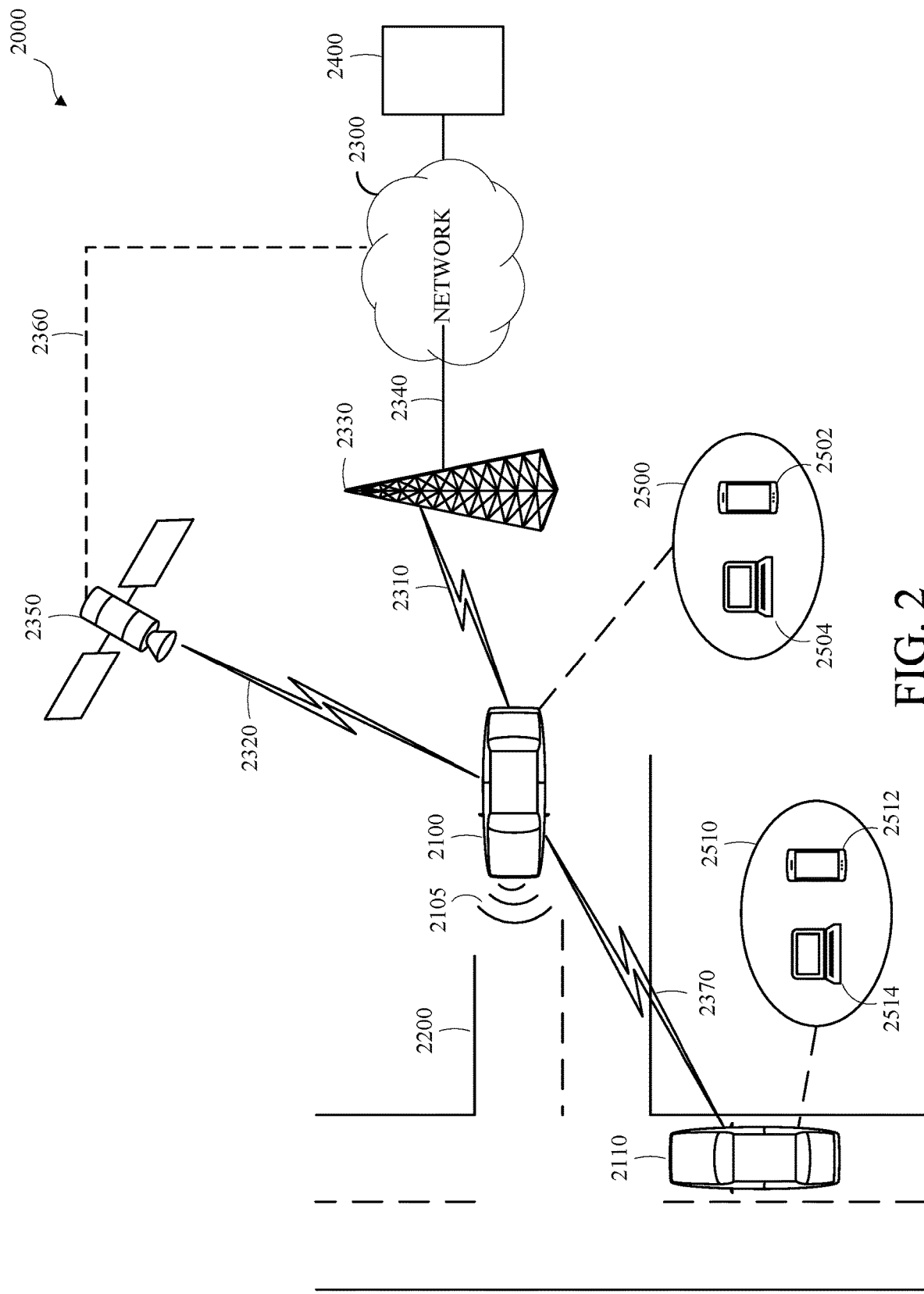
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and one communication device 2400, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
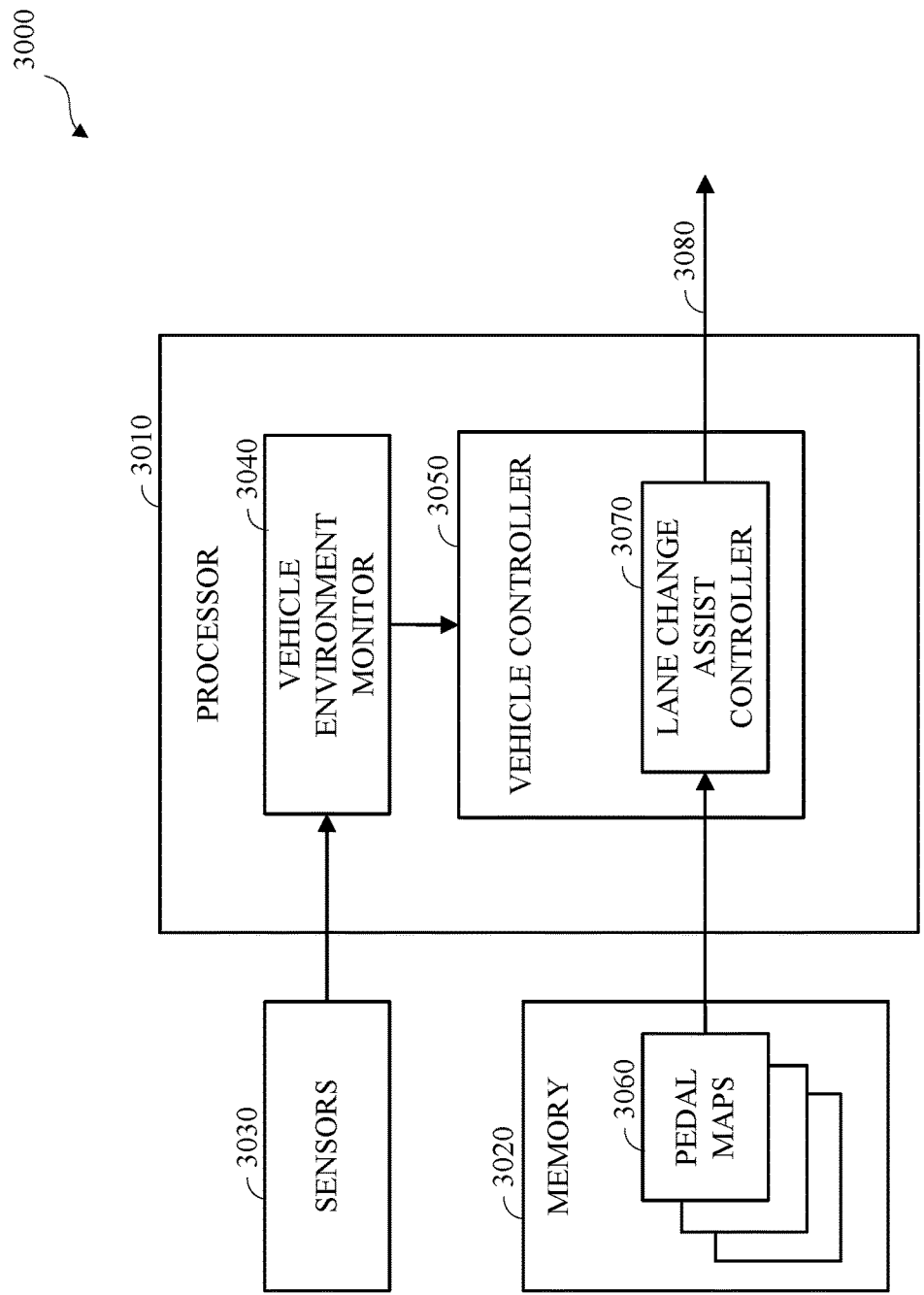
FIG. 3 is a diagram of an example of a reactive lane change assist system for use in a vehicle in accordance with this disclosure.

FIG. 3 is a diagram of an example of a reactive lane change assist system 3000 for use in a vehicle in accordance with this disclosure. The reactive lane change assist system 3000 includes a processor 3010, such as processor 1330 shown in FIG. 1, a memory 3020, such as memory 1340 shown in FIG. 1, and one or more sensors 3030, such as sensor 1360 shown in FIG. 1.

The processor 3010 includes a vehicle environment monitor 3040 and a vehicle controller 3050. The vehicle environment monitor 3040 may correlate, associate, or otherwise process the operational environment data to determine a scene. Determining a scene may include identifying, tracking, or predicting actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the vehicle environment monitor 3040 may receive information, such as sensor data, from the one or more sensors 3030, which may correspond to one or more remote vehicles in the operational environment of the autonomous vehicle, one or more aspects of the operational environment of the autonomous vehicle in the operational environment of the autonomous vehicle or a combination thereof geospatially corresponding to a scene, such as, for example, associated with a lane-change operation. The vehicle environment monitor 3040 may associate the sensor data with one or more identified remote vehicles in the operational environment of the autonomous vehicle, one or more aspects of the operational environment of the autonomous vehicle, or a combination thereof geospatially corresponding to a lane-change operation, which may include identifying a current or expected direction of travel, a path, such as an expected path, a current or expected velocity, a current or expected acceleration rate, or a combination thereof, for one or more of the respective identified remote vehicles. The vehicle environment monitor 3040 may output the identified, associated, or generated scene information to, or for access by, the vehicle controller 3050. The scene information may classify vehicles as in-lane, neighbor-lane, on-coming, or other classification. An in-lane vehicle may be classified as a lead vehicle that the host vehicle has identified to follow. A neighbor-lane vehicle may be classified as a neighbor vehicle that is in a neighbor lane. A neighbor vehicle may be re-classified as a lead vehicle after the host vehicle performs or is performing a lane change into the neighbor lane. An on-coming vehicle is a vehicle that is traversing in a direction towards the host vehicle, and may be in the same lane as the vehicle or a neighbor lane.

The memory 3020 includes one or more pedal maps 3060. The pedal maps 3060 may be referred to as accelerator maps and may be associated with a driving modes such as normal mode, a regenerative mode, or a comfort mode. For example, a regenerative mode may provide a heavy deceleration (i.e., active braking) when the accelerator pedal is released, and a comfort mode may provide a minimal deceleration so as to provide a gliding experience when the accelerator pedal is released. A normal mode may be a blend of the regenerative mode and comfort mode where a moderate deceleration is provided. Each pedal map may be a representation of a method to convert the driver's accelerator pedal output (APO) to a driver torque request. A pedal map may be expressed as curves of torque versus speed and APO, and may be used to estimate a driver torque or acceleration request based on the driving mode, vehicle speed, and APO.

The vehicle controller 3050 includes a lane change assist controller 3070 and is configured to receive the scene information from the vehicle environment monitor 3040. The lane change assist controller 3070 is configured to modify a pedal map from the memory 3020 based on the scene information. A dynamically modified pedal map may be used to adjust the available range of torque requests based on a deceleration estimate of a lead vehicle, a neighbor vehicle, or both. The lane change assist controller 3070 may output a reactive assist request 3080. The reactive assist request 3080 may be based on a confidence value of the deceleration estimate of the lead vehicle. In an example, the reactive assist request may be a torque request that is subtracted from a nominal torque request in a selected driving mode to adjust the estimate of the driver torque request to better match the driver's expected deceleration in that scene.

Figure 4:
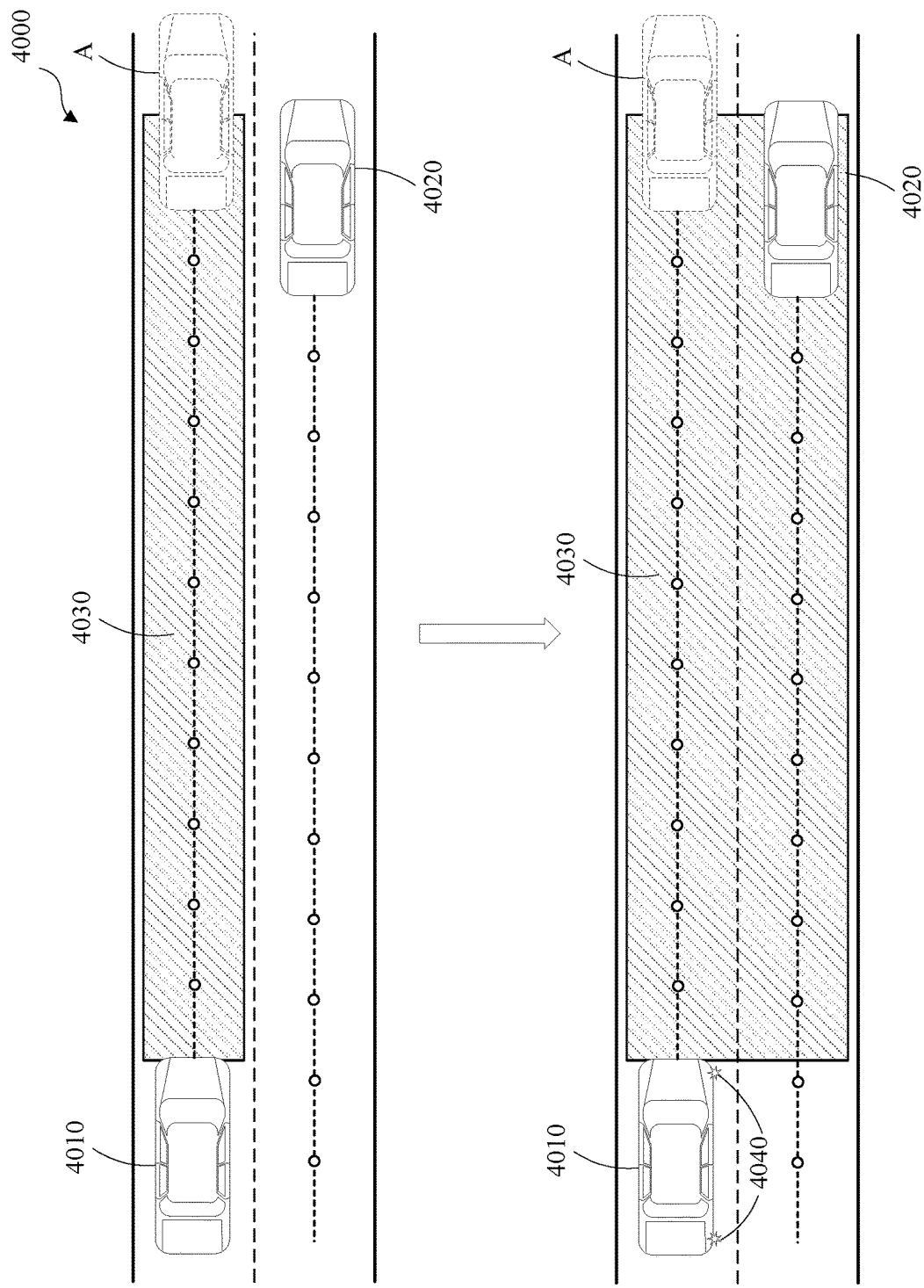
FIG. 4 is a block diagram of an example of a reactive lane change assist region of interest in accordance with this disclosure.

FIG. 4 is a block diagram of an example of a reactive lane change assist region of interest 4000 in accordance with this disclosure. FIG. 4 shows a host vehicle 4010 and a remote vehicle 4020 traversing in the same direction on a multi-lane road, such as a highway. As shown in FIG. 4, the host vehicle 4010 is traversing in a lane of the multi-lane road, and at some point in time will reach point A. The points shown between the host vehicle 4010 and point A are points that the vehicle 4010 are predicted to be in on the way to point A. In this example, there is no vehicle in the lane in front of the host vehicle 4010. In this example, the remote vehicle 4020 is in a neighbor lane relative to the lane that the host vehicle 4010 is traversing. Accordingly, in this example, the remote vehicle 4020 is a neighbor vehicle.

FIG. 4 shows a region of interest 4030, which is a potential area of travel of the host vehicle 4010. The region of interest 4030 may be based on a speed of the host vehicle 4010, a steering angle of the host vehicle 4010, a yaw rate of the host vehicle 4010, a longitudinal distance straight ahead of the host vehicle 4010, a lateral distance to the left or right of the vehicle based on the width of a lane or the width of a lead vehicle or a neighbor vehicle, or any combination thereof. The longitudinal and lateral distances are based on X and Y coordinates relative to the host vehicle, where X is the distance straight ahead of the host vehicle, and Y is the distance to the left or right of the host vehicle. In an example, if the host vehicle is traveling at 30 meters per second with a zero yaw rate, then it may be expected that the host vehicle will travel 60 meters in a longitudinal direction in 2 seconds and zero meters in a lateral direction. With non-zero yaw rates, the expected longitudinal distance traveled decreases since the host vehicle follows a curve, and the expected lateral distance traveled increases positive or negative based on yaw rate sign. The steering angle of the host vehicle 4010 may be associated with a yaw rate of the host vehicle 4010. At some point in time, an operator of the host vehicle 4010 may determine to perform a lane-change operation and initiate a turn indicator 4040. Based on a detection of the turn indicator 4040, the host vehicle 4010 may increase the region of interest 4030 to include the neighbor lane. The increased region of interest may be based on a lateral distance such as a lane width of the neighbor lane or a width of the neighbor vehicle.

Figure 5:
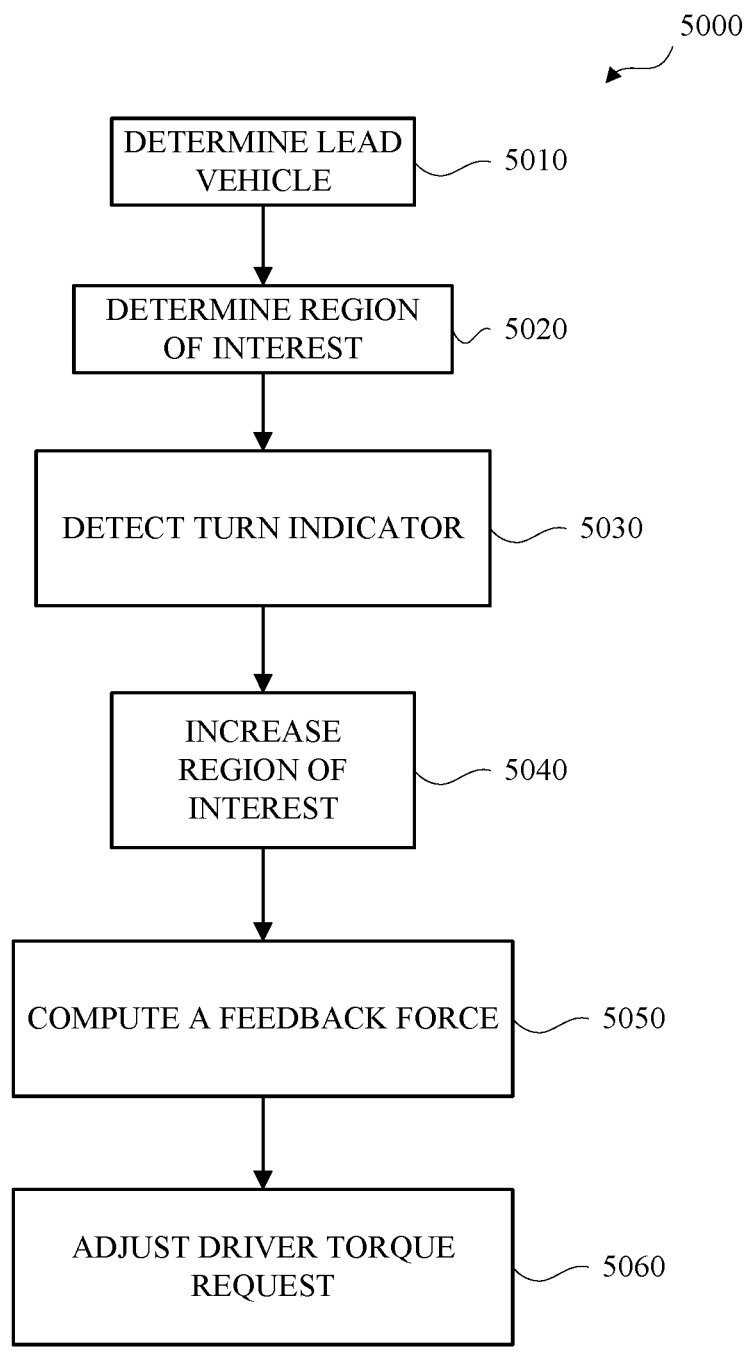
FIG. 5 is a flow diagram of an example of a reactive lane change assist method for use in a vehicle in accordance with embodiments of this disclosure.

FIG. 5 is a flow diagram of an example of a reactive lane change assist method 5000 for use in a vehicle in accordance with embodiments of this disclosure. The reactive lane change assist method 5000 may be performed by the reactive lane change assist system 3000 shown in FIG. 3. In this example, a host vehicle, such as host vehicle 4010 shown in FIG. 4, may be following another vehicle in the same lane and then perform a lane-change operation to another lane that has a neighbor vehicle, such as remote vehicle 4020 shown in FIG. 4. The reactive lane change assist method 5000 includes determining 5010 a lead vehicle. Determining 5010 the lead vehicle may be based on a proximate distance between a host vehicle and a lead vehicle candidate. The lead vehicle candidate may be another vehicle traveling in the same lane as the host vehicle, or it may be another vehicle traveling in a neighbor lane, such as remote vehicle 4020 shown in FIG. 4.

The reactive lane change assist method 5000 includes determining 5020 a region of interest. The region of interest is a potential area of travel of the host vehicle. Determining 5020 a region of interest may include determining a series of locations specified by longitudinal distances ahead of the host vehicle and lateral distances based on the host vehicle speed, steering angle, yaw rate, and a width of the lead vehicle. In some examples, the first lateral distance may be based on a width of a lane in which the lead vehicle is traveling.

The reactive lane change assist method 5000 includes detecting 5030 a turn indicator of the host vehicle and increasing 5040 the region of interest based on the detection of the turn indicator. The region of interest may be increased by a second lateral distance in response to the detection of the turn indicator. The increased region of interest may include a neighbor vehicle, and the second lateral distance may be based on a width of the neighbor vehicle. In some examples, the second lateral distance may be based on a width of a lane in which the neighbor vehicle is traveling. In some examples, the increased region of interest may be based on a speed, yaw rate, or steering angle of the host vehicle.

The reactive lane change assist method 5000 includes computing 5050 a feedback force. The feedback force may be computed based on a deceleration estimate of the lead vehicle, a deceleration estimate of the neighbor vehicle, or both. The deceleration estimate of the lead vehicle may be a dynamic estimate that is based on a function of a relative distance of the lead vehicle from the host vehicle, a relative speed of the lead vehicle, and a relative acceleration of the lead vehicle. The deceleration estimate of the neighbor vehicle may be a dynamic estimate that is based on a function of a relative distance of the neighbor vehicle from the host vehicle, a relative speed of the neighbor vehicle, and a relative acceleration of the neighbor vehicle. The feedback force may be computed based on a minimum function of the deceleration estimate of the lead vehicle and the deceleration estimate of the neighbor vehicle. For example, if the deceleration estimate of the lead vehicle is less than the deceleration estimate of the neighbor vehicle, the deceleration estimate of the lead vehicle may be selected to compute the feedback force.

The reactive lane change assist method 5000 includes adjusting 5060 the driver torque request based on the computed feedback force. Adjusting 5060 the driver torque request effectively changes the APO-to-torque conversion to match driver expectation. For example, during open, free moving situations, the driver may want to relax and take their foot off the accelerator. In these situations, the host vehicle will automatically adjust the APO-to-torque conversion to reduce the maximum deceleration torque request so as to allow the vehicle coast and cruise as expected. In traffic or in locations requiring higher speed modulations, such as intersections and parking lots, the driver may expect more deceleration from the vehicle when the driver takes their foot off the accelerator. In these situations, the host vehicle will automatically adjust the APO-to-torque conversion to increase the maximum deceleration so as to decelerate sufficiently when the driver releases the accelerator pedal. The APO-to-torque conversion may be adjusted based on one or more accelerator maps. The one or more accelerator maps may be associated with a driving mode and include a normal mode accelerator map, a regenerative mode accelerator map, and a comfort mode accelerator map. The adjustment of the driver torque request may be based on a reactive assist request. The reactive assist request may be based on a confidence value of the deceleration estimate of the lead vehicle. In an example, the reactive assist request may be a torque request that is subtracted from a base offset of the APO of a selected driving mode to adjust the accelerator feedback force.

Figure 6:
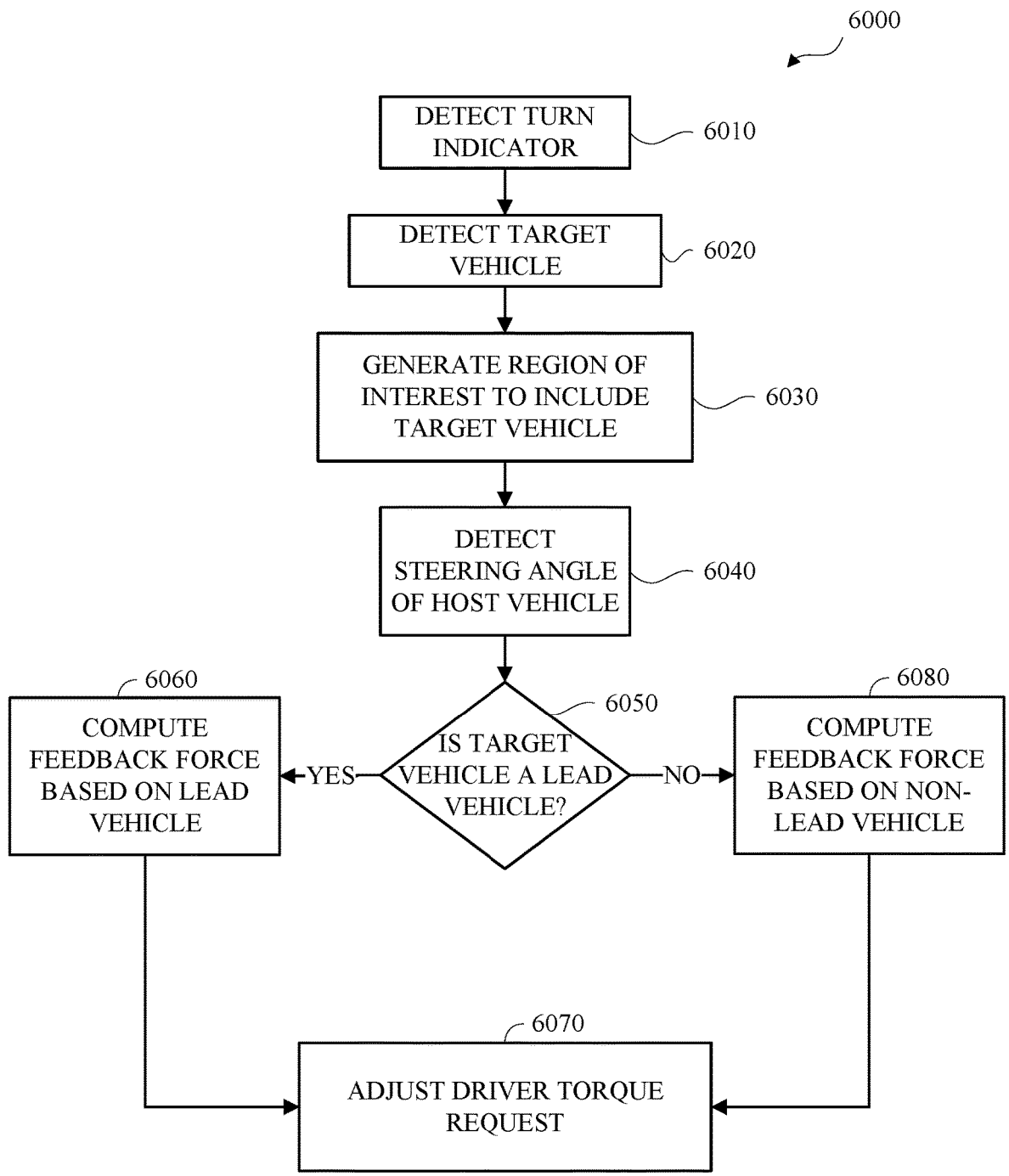
FIG. 6 is a flow diagram of an example of another reactive lane change method for use in a vehicle in accordance with embodiments of this disclosure.

FIG. 6 is a flow diagram of an example of another reactive lane change method 6000 for use in a vehicle in accordance with embodiments of this disclosure. In this example, a host vehicle may perform a turn in one lane while avoiding another vehicle making a turn in a neighbor lane. The reactive lane change method 6000 includes detecting 6010 a turn indicator of the host vehicle and detecting 6020 a target vehicle. The target vehicle may be any vehicle that is detected within an operational environment of the host vehicle.

The reactive lane change method 6000 includes generating 6030 a region of interest. The region of interest may include the target vehicle. The region of interest may be determined based on the detection of the turn indicator, the detection of the target vehicle, or both.

The reactive lane change method 6000 includes detecting 6040 a steering angle of the host vehicle and determining 6050 whether the target vehicle is a lead vehicle. The determination of whether the target vehicle is a lead vehicle may be based on the speed of the target vehicle, the steering angle of the host vehicle, or both. For example, if the target vehicle speed is zero, the host vehicle may determine that the target vehicle is a parked vehicle, and therefore the target vehicle is a non-lead vehicle. In an example where the host vehicle is in a turning lane, if the target vehicle speed is greater than zero and the target vehicle is in a neighbor turning lane with its turn indicator on, the host vehicle may determine that the target vehicle is a non-lead vehicle if the steering angle of the host vehicle indicates that the host vehicle is not performing a lane change.

If it is determined 6050 that the target vehicle is a lead vehicle, the reactive lane change method 6000 includes computing 6060 a feedback force based on the lead vehicle. The feedback force may be computed based on a deceleration estimate of the lead vehicle. The deceleration estimate of the lead vehicle may be a dynamic estimate that is based on a function of a relative distance of the lead vehicle from the host vehicle, a relative speed of the lead vehicle, and a relative acceleration of the lead vehicle.

In response to computing 6060 the feedback force based on the lead vehicle, the reactive lane change method 6000 includes adjusting 6070 the driver torque request based on the computed feedback force. Adjusting 6070 the driver torque request effectively changes the APO-to-torque conversion to match driver expectation. For example, during open, free moving situations, the driver may want to relax and take their foot off the accelerator. In these situations, the host vehicle will automatically adjust the APO-to-torque conversion to reduce the maximum deceleration torque request so as to allow the vehicle to coast and cruise as expected. In traffic or in locations requiring higher speed modulations, such as intersections and parking lots, the driver may expect more deceleration from the vehicle when the driver takes their foot off the accelerator. In these situations, the host vehicle will automatically adjust the APO-to-torque conversion to increase the maximum deceleration so as to decelerate sufficiently when the driver releases the accelerator pedal. The APO-to-torque conversion may be adjusted based on one or more accelerator maps. The one or more accelerator maps may be associated with a driving mode and include a normal mode accelerator map, a regenerative mode accelerator map, and a comfort mode accelerator map. The adjustment of the driver torque request may be based on a reactive assist request. The reactive assist request may be based on a confidence value of the deceleration estimate of the lead vehicle. In an example, the reactive assist request may be a torque request that is subtracted from a base offset of the APO of a selected driving mode to adjust the accelerator feedback force.

If it is determined 6050 that the target vehicle is a non-lead vehicle, the reactive lane change method 6000 includes computing 6080 a feedback force based on a non-lead vehicle. In an example, the feedback force may be computed based on having no lead vehicle.

In response to computing 6080 the feedback force based on a non-lead vehicle, the reactive lane change method 6000 includes adjusting 6070 the driver torque request based on the computed feedback force. Adjusting 6070 the driver torque request effectively changes the APO-to-torque conversion to match driver expectation. For example, during open, free moving situations, the driver may want to relax and take their foot off the accelerator. In these situations, the host vehicle will automatically adjust the APO-to-torque conversion to reduce the maximum deceleration torque request so as to allow the vehicle coast and cruise as expected. In traffic or in locations requiring higher speed modulations, such as intersections and parking lots, the driver may expect more deceleration from the vehicle when the driver takes their foot off the accelerator. In these situations, the host vehicle will automatically adjust the APO-to-torque conversion to increase the maximum deceleration so as to decelerate sufficiently when the driver releases the accelerator pedal. The APO-to-torque conversion may be adjusted based on one or more accelerator maps. The one or more accelerator maps may be associated with a driving mode and include a normal mode accelerator map, a regenerative mode accelerator map, and a comfort mode accelerator map. The adjustment of the driver torque request may be based on a reactive assist request. The reactive assist request may be based on a confidence value of the deceleration estimate of the lead vehicle. In an example, the reactive assist request may be a torque request that is subtracted from a base offset of the APO of a selected driving mode to adjust the accelerator feedback force.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in a host vehicle, the method comprising:
    determining a lead vehicle based on a proximate distance between the host vehicle and a lead vehicle candidate;
    determining a region of interest by a longitudinal distance based on a speed of the host vehicle, a steering angle of the host vehicle, a yaw rate of the host vehicle, and a first lateral distance based on a width of the lead vehicle, wherein the region of interest is a potential area of travel of the host vehicle;
    detecting a turn indicator of the host vehicle;
    increasing the region of interest by a second lateral distance in response to the detection of the turn indicator, wherein the increased region of interest includes a neighbor vehicle, and wherein the second lateral distance is based on a width of the neighbor vehicle;
    computing a feedback force based on a deceleration estimate of the lead vehicle and a deceleration estimate of the neighbor vehicle; and
    adjusting an accelerator pedal output (APO)-to-torque conversion based on the computed feedback force.

2. The method of claim 1, wherein the feedback force is computed based on a minimum function of the deceleration estimate of the lead vehicle and the deceleration estimate of the neighbor vehicle.

3. The method of claim 1, wherein the increased region of interest is based on a speed of the host vehicle and a yaw rate of the host vehicle.

4. The method of claim 1, wherein the deceleration estimate of the lead vehicle is a dynamic estimate that is based on a function of a relative distance of the lead vehicle, a relative speed of the lead vehicle, and a relative acceleration of the lead vehicle.

5. The method of claim 1, wherein the deceleration estimate of the neighbor vehicle is a dynamic estimate that is based on a function of a relative distance of the neighbor vehicle, a relative speed of the neighbor vehicle, and a relative acceleration of the neighbor vehicle.

6. The method of claim 1, wherein increasing the region of interest is based on a detected speed of the host vehicle and a steering angle of the host vehicle.

7. The method of claim 1, wherein increasing the region of interest is based on a detected speed of the neighbor vehicle and a steering angle of the host vehicle.

8. The method of claim 1, wherein the APO-to-torque conversion is adjusted based on one or more accelerator maps.

9. The method of claim 8, wherein the one or more accelerator maps include a normal mode accelerator map, a regenerative mode accelerator map, and a comfort mode accelerator map.

10. The method of claim 1, wherein the first lateral distance is based on a width of a lane in which the lead vehicle is traveling, and the second lateral distance is based on a width of a lane in which the neighbor vehicle is traveling.

11. A host vehicle comprising:
    a sensor configured to detect a proximate distance of an object from the host vehicle;
    a processor configured to:
        determine that the object is a lead vehicle based on the proximate distance between the host vehicle and the object;
        determine a region of interest by a longitudinal distance based on a speed of the host vehicle, a steering angle of the host vehicle, a yaw rate of the host vehicle, and a first lateral distance associated with a width of the lead vehicle, wherein the region of interest is a potential area of travel of the host vehicle;
        detect a turn indicator of the host vehicle;
        increase the region of interest by a second lateral distance in response to the detection of the turn indicator, wherein the increased region of interest includes a neighbor vehicle;
        compute a feedback force based on a deceleration estimate of the lead vehicle and a deceleration estimate of the neighbor vehicle; and
        adjust an accelerator pedal output (APO)-to-torque conversion based on the computed feedback force.

12. The host vehicle of claim 11, wherein the processor is configured to compute the feedback force based on a minimum function of the deceleration estimate of the lead vehicle and the deceleration estimate of the neighbor vehicle.

13. The host vehicle of claim 11, wherein the increased region of interest is based on a speed of the host vehicle and a yaw rate of the host vehicle.

14. The host vehicle of claim 11, wherein the deceleration estimate of the lead vehicle is a dynamic estimate that is based on a function of a relative distance of the lead vehicle, a relative speed of the lead vehicle, and a relative acceleration of the lead vehicle.

15. The host vehicle of claim 11, wherein the deceleration estimate of the neighbor vehicle is a dynamic estimate that is based on a function of a relative distance of the neighbor vehicle, a relative speed of the neighbor vehicle, and a relative acceleration of the neighbor vehicle.

16. The host vehicle of claim 11, wherein the processor is configured to increase the region of interest based on a detected speed of the host vehicle and a steering angle of the host vehicle.

17. The host vehicle of claim 11, wherein the processor is configured to increase the region of interest based on a detected speed of the host vehicle and a steering angle of the host vehicle.

18. The host vehicle of claim 11, wherein the processor is configured to adjust the APO-to-torque conversion based on one or more accelerator maps.

19. The host vehicle of claim 18, wherein the one or more accelerator maps include a normal mode accelerator map, a regenerative mode accelerator map, and a comfort mode accelerator map.

20. The host vehicle of claim 11, wherein the processor is configured to determine the first lateral distance based on a width of a lane in which the lead vehicle is traveling, and determine the second lateral distance based on a width of a lane in which the neighbor vehicle is traveling.

\* \* \* \* \*